(12) United States Patent
Tsai et al.

(10) Patent No.: US 7,724,538 B2
(45) Date of Patent: May 25, 2010

(54) RETAINING DEVICE FOR PCI CARD

(75) Inventors: Ho-Chin Tsai, Taipei Hsien (TW); Li-Ping Chen, Taipei Hsien (TW); Lung-Sheng Tsai, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 228 days.

(21) Appl. No.: 11/871,169

(22) Filed: Oct. 12, 2007

(65) Prior Publication Data
US 2009/0073666 A1  Mar. 19, 2009

(30) Foreign Application Priority Data
Sep. 18, 2007 (CN) ............... 2007 2 0201036.1

(51) Int. Cl.
*H05K 7/14* (2006.01)
*H05K 7/18* (2006.01)

(52) U.S. Cl. ..................... 361/802; 361/801
(58) Field of Classification Search ......... 361/807–810, 361/800–802, 752, 790, 797
See application file for complete search history.

(56) References Cited

U.S. PATENT DOCUMENTS

| | | | | |
|---|---|---|---|---|
| 4,971,563 A * | 11/1990 | Wells, III | ............... | 439/61 |
| 5,601,349 A * | 2/1997 | Holt | ............... | 312/265.6 |
| 5,936,835 A * | 8/1999 | Astier | ............... | 361/679.31 |
| 6,215,668 B1 * | 4/2001 | Hass et al. | ............... | 361/759 |
| 6,772,246 B2 | 8/2004 | Kim et al. | | |
| 6,920,048 B2 * | 7/2005 | Holt et al. | ............... | 361/726 |
| 7,113,407 B2 * | 9/2006 | Holt et al. | ............... | 361/726 |
| 7,120,032 B2 * | 10/2006 | Lin et al. | ............... | 361/801 |
| 7,525,815 B2 * | 4/2009 | Chen et al. | ............... | 361/788 |
| 2009/0073645 A1 * | 3/2009 | Tsai et al. | ............... | 361/679.6 |

\* cited by examiner

*Primary Examiner*—Hung S Bui
(74) *Attorney, Agent, or Firm*—Frank R. Niranjan

(57) ABSTRACT

A retaining device for PCI card includes a chassis, a clipping plate configured for retaining a PCI card, and a latch member. The chassis has a rear wall. A mounting bracket secured on the rear wall. A blocking wall perpendicularly extends from the rear wall. The mounting bracket includes a sidewall opposite to the blocking wall. The clipping plate includes a first end engaged with the chassis and a second end abutting on the sidewall of the mounting bracket. The latch member is tightly sandwiched between the blocking wall of the chassis and the sidewall of the mounting bracket. The latch member depresses the second end of the clipping plate thereby forcing the second end of the clipping plate to abut against the sidewall of the mounting bracket.

14 Claims, 5 Drawing Sheets

RETAINING DEVICE FOR PCI CARD

BACKGROUND

1. Field of the Invention

The present invention relates to retaining devices, more particularly to a retaining device for PCI card.

2. Description of Related Art

Peripheral component interconnect cards (PCI) are widely used in computers. PCI is a kind of bus structure, which is used for connecting to modem cards, monitor cards, sound cards or other peripheral equipment. The common fixing manner for PCI cards usually involves screws. Such a manner not only requires screws but also a screwdriver, which is time-consuming and troublesome, and the screws are easily lost. Moreover, if a screw falls on the PCB and is not noticed, damage may occur when the computer is powered up. Furthermore, with the development of computers, more and more components are needed to be installed in the computer. The space in the computer enclosure will be occupied by a mass of electronic components so that not enough space for operating a screwdriver will exist.

What is needed, therefore, is a retaining device for simply securing PCI cards in a compact computer enclosure.

SUMMARY

A retaining device for PCI card includes a chassis, a clipping plate configured for retaining a PCI card, and a latch member. The chassis has a rear wall. A mounting bracket secured on the rear wall. A blocking wall perpendicularly extends from the rear wall. The mounting bracket includes a sidewall opposite to the blocking wall. The clipping plate includes a first end engaged with the chassis and a second end abutting on the sidewall of the mounting bracket. The latch member is tightly sandwiched between the blocking wall of the chassis and the sidewall of the mounting bracket. The latch member depresses the second end of the clipping plate thereby forcing the second end of the clipping plate to abut against the sidewall of the mounting bracket.

Other advantages and novel features of the present invention will become more apparent from the following detailed description of preferred embodiment when taken in conjunction with the accompanying drawings, in which:

DETAILED DESCRIPTION OF THE EMBODIMENT

Figure 1:
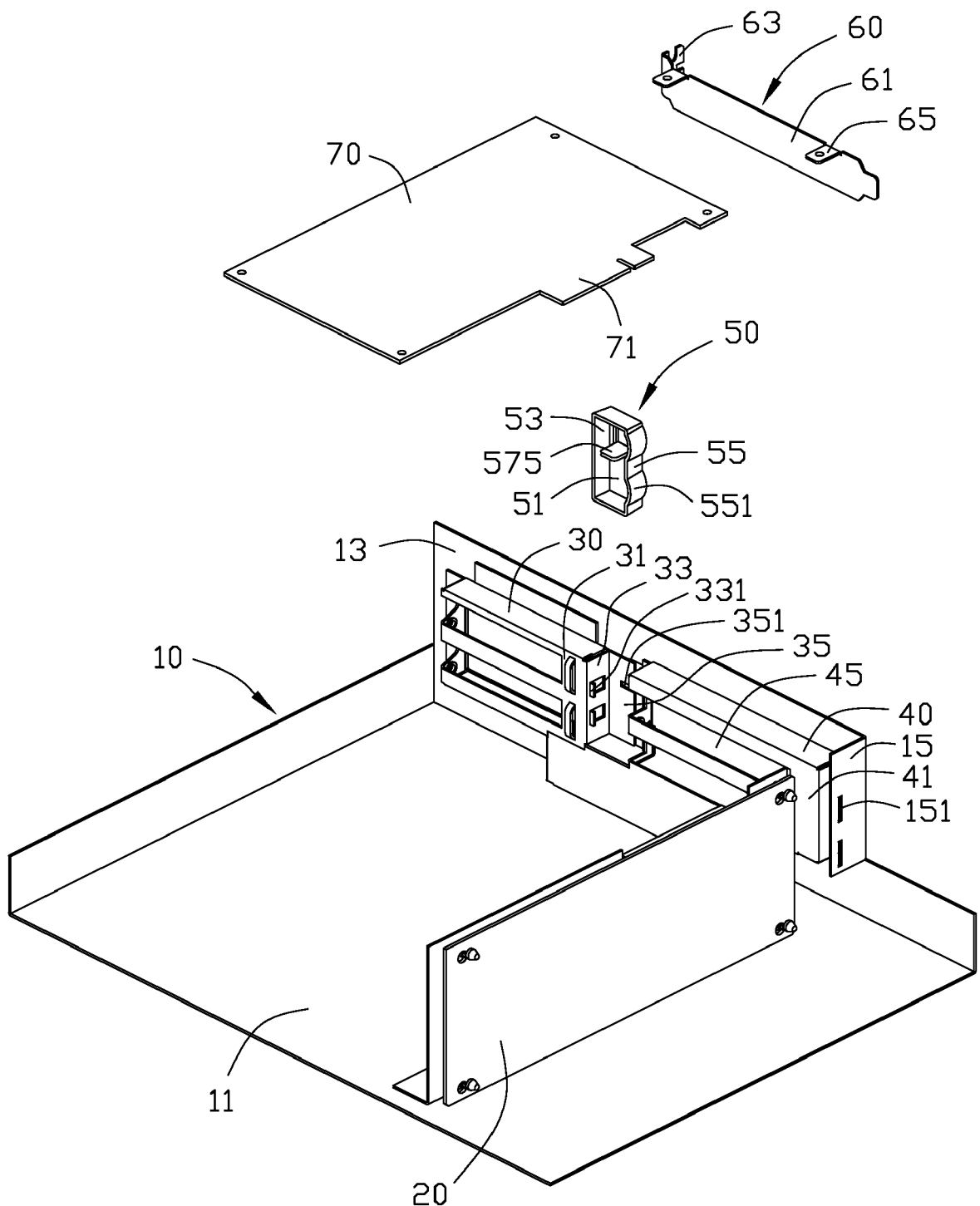
FIG. 1 is an exploded, isometric view of a retaining device for PCI card in accordance with a preferred embodiment, including a chassis, a clipping plate for fastening a PCI card, and a latch member.
Figure 2:
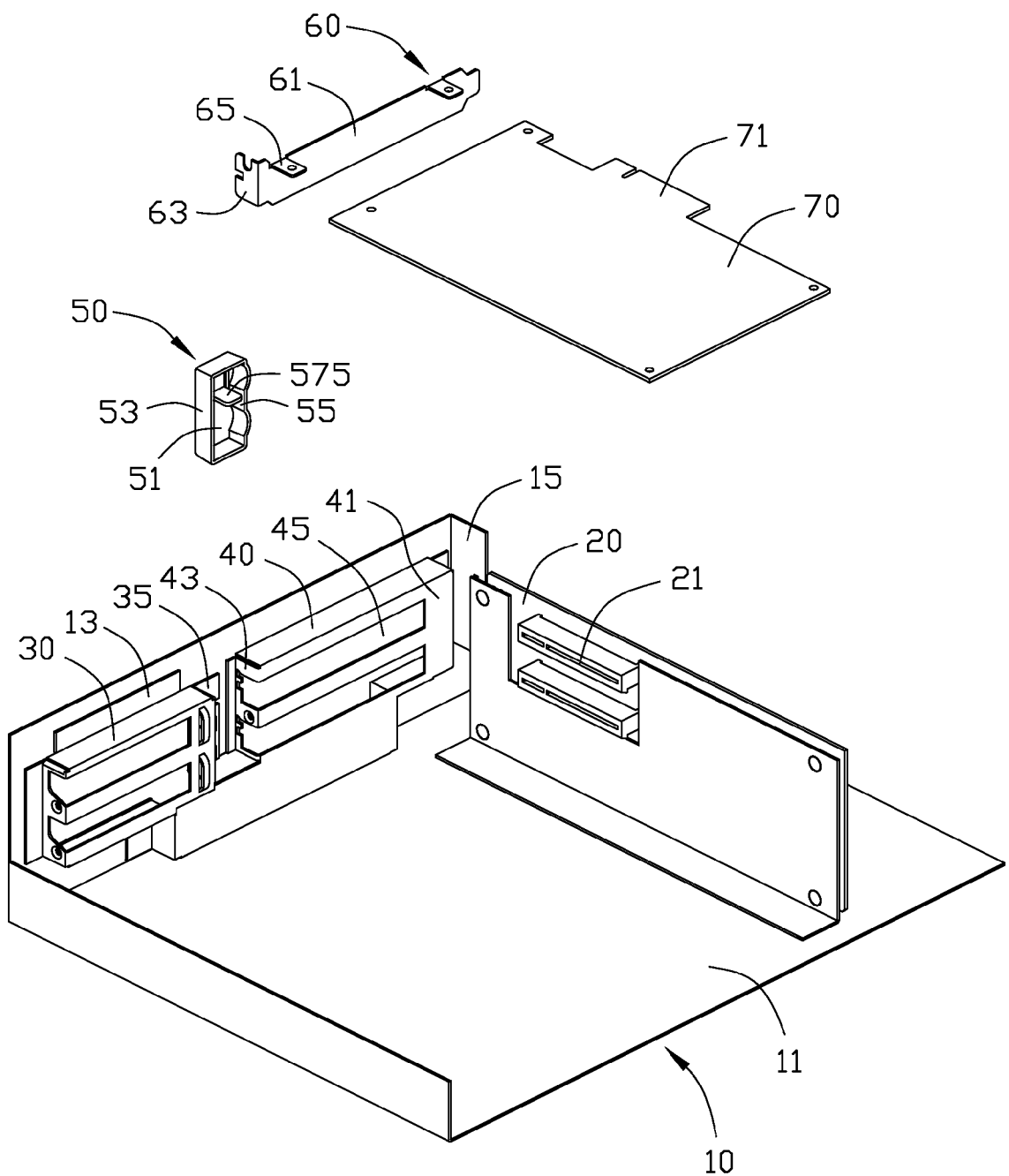
FIG. 2 is similar to FIG. 1, but viewed from another aspect.

Referring to FIGS. 1 and 2, a retaining device for PCI cards in accordance with a preferred embodiment of the present invention includes a chassis 10, a latch member 50, and a clipping plate 60 for fastening a PCI card 70. The PCI card 70 is rectangular with a connecting portion 71 protruding from one side thereof.

The chassis 10 includes a bottom wall 11 and a rear wall 13 perpendicularly extending from the bottom wall 11. A transfer card 20 perpendicular to the bottom wall 11 and the rear wall 13 is mounted on the bottom wall 11. Two ports 21 aligned in a direction perpendicular to the bottom wall 11 are formed on the transfer card 20. A first mounting bracket 30 and a second mounting bracket 40 are secured to the rear wall 13 for mounting a plurality of PCI cards. The first mounting bracket 30 includes a front panel 31 parallel to the rear wall 13 and a blocking wall 33 perpendicular to the front panel 31, the bottom wall 11, and the rear wall 13. The blocking wall 33 can also perpendicularly extend from the rear wall 13. A pair of blocking tabs 331 parallel to the rear wall 13 protrudes from the blocking wall 33. A plate 35 abutting the rear wall 13 extends from an edge of the blocking wall 33. A securing slot 351 is defined in the plate 35. The second mounting bracket 40 includes a front panel 41 and a sidewall 43 opposite to the blocking wall 33 of the first mounting bracket 30. A pair of expansion slots 45 is spacedly and transversally defined in the second mounting bracket 40 extending from the front panel 41 to the sidewall 43. A bent plate 15 perpendicular to the bottom wall 11 extends from the rear wall 13 adjacent to the second mounting bracket 40. Two slots 151 aligned in a vertical direction perpendicular to the bottom wall 11 are defined in the bent plate 15.

Figure 3:
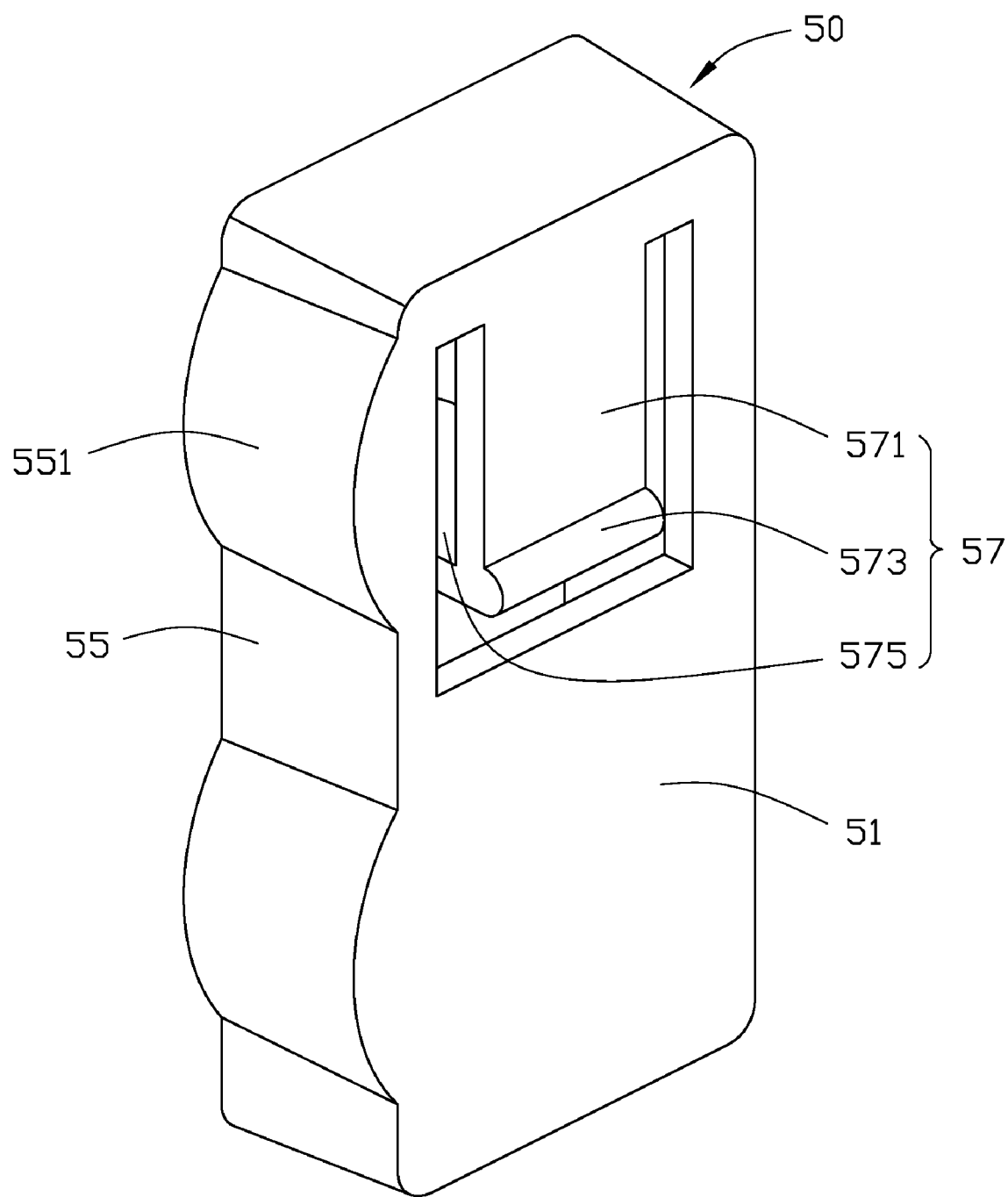
FIG. 3 is an enlarged view of the latch member in FIG. 1, but view from another aspect.

Referring also to FIG. 3, the latch member 50 is substantially rectangular, including a bottom wall 51 and two sidewalls 53 and 55 opposite to each other and perpendicular to the bottom wall 51. An elastic securing member 57 is formed on the bottom wall 51 of the latching member 50. The securing member 57 includes a cantilever 571 formed in the bottom wall 51 and a handle 575 perpendicularly extending from the free end of the cantilever 571. A protrusion 573 is formed at a joint of the cantilever 571 and the handle 575 corresponding to the securing slot 331 in the plate 35 of the first mounting bracket 30. The extension direction of the protrusion 573 is away from that of the handle 575. Two elastic arcuate pressing portions 551 spacedly protrude from the side wall 55, and the width between the sidewall 53 and a peak portion of the arcuate pressing portion 551 is slightly greater than that between the blocking wall 33 of the first mounting bracket 30 and the sidewall 43 of the second mounting bracket 40.

The clipping plate 60 is substantially L-shaped, including an elongated base 61 and a blocking tab 63 perpendicularly extending from an end of the elongated base 61. Two securing tabs 65 extend from an edge of the elongated base 61 for securing the PCI card 70.

Figure 4:
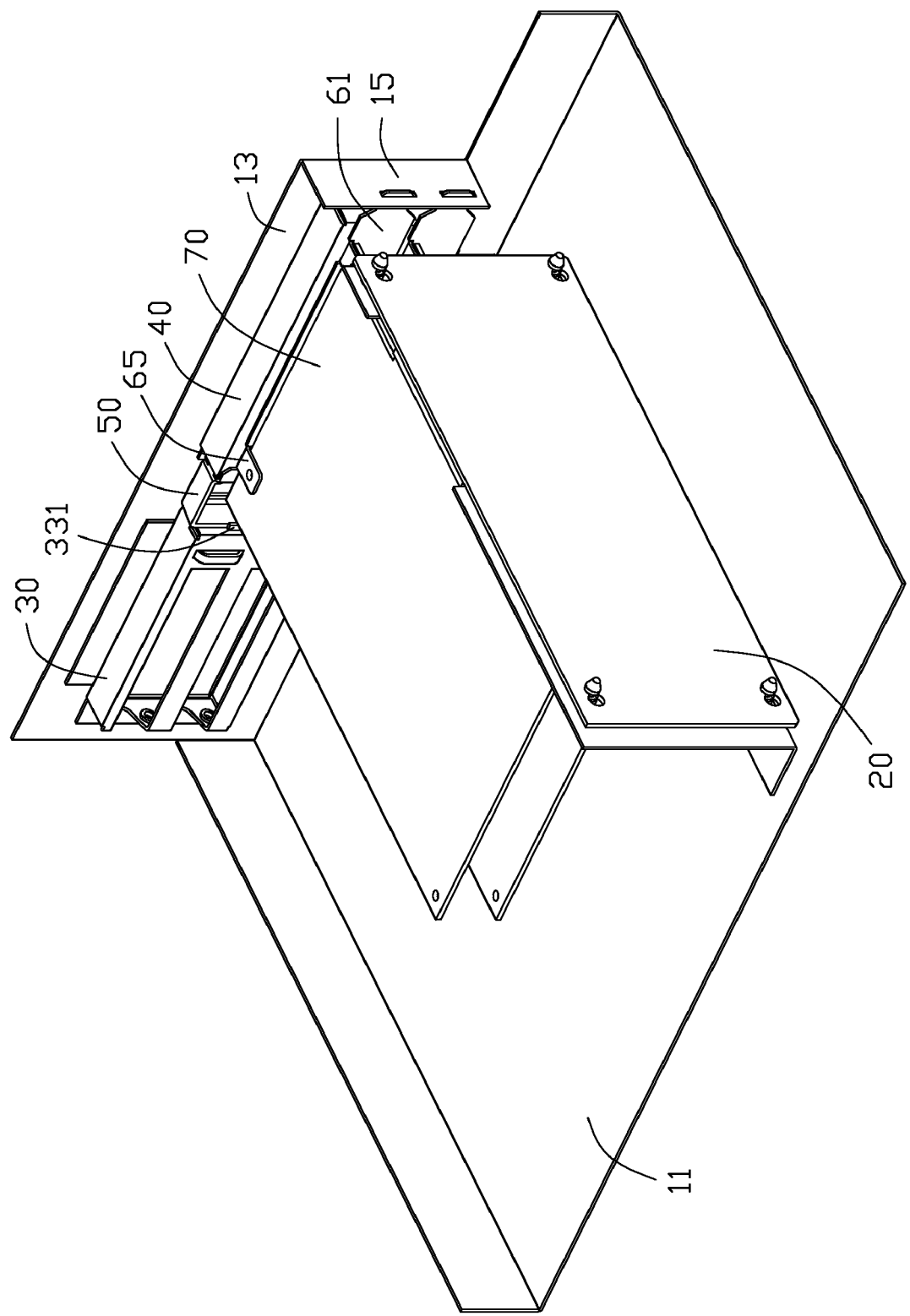
FIG. 4 is an assembled view of FIG. 1.
Figure 5:
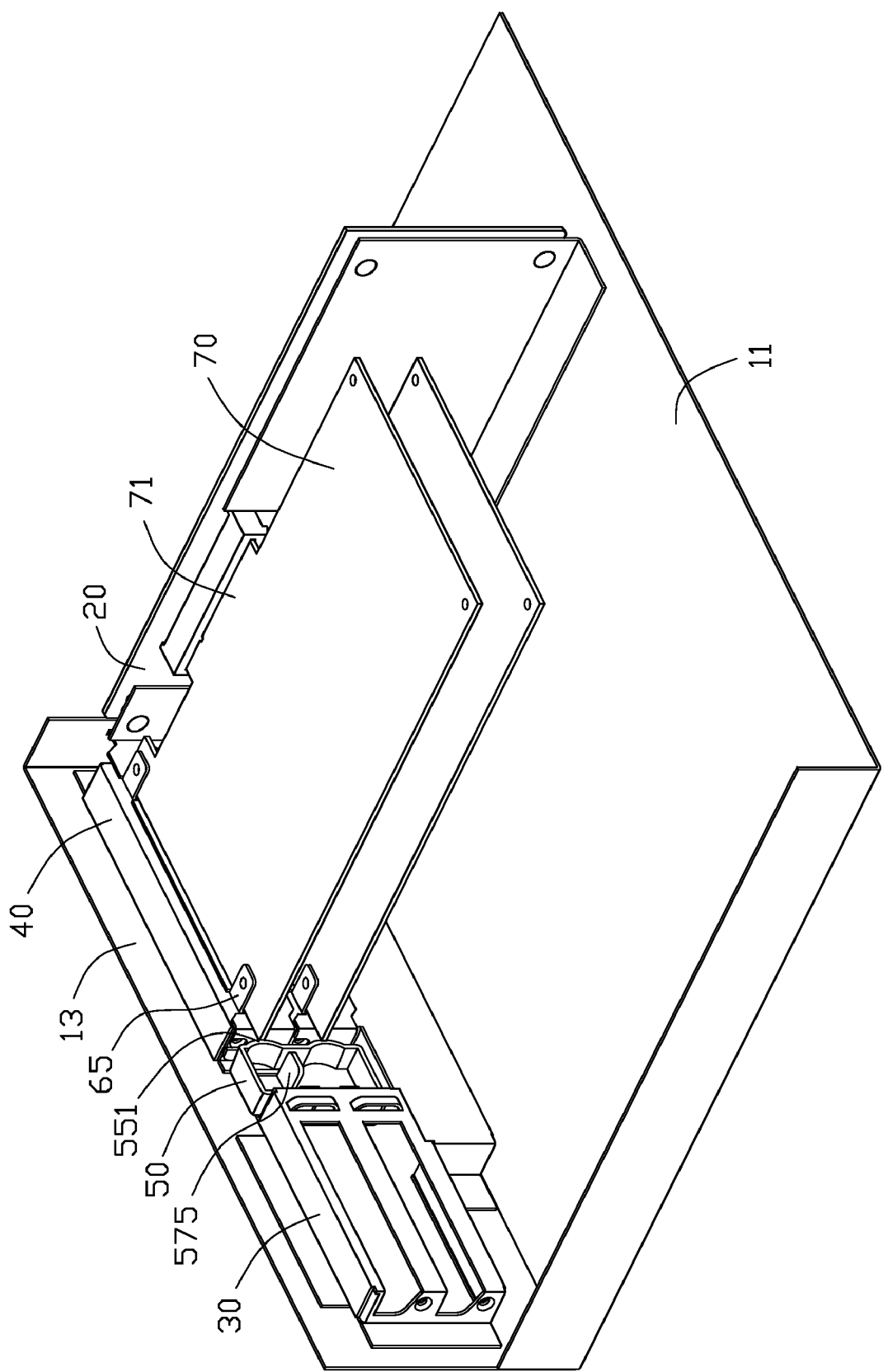
FIG. 5 is an assembled view of FIG. 2.

Referring to FIGS. 4 and 5, in assembly, two clipping plates 60 with two PCI cards 70 respectively mounted thereon are placed to cover the corresponding expansion slots 45 in the second mounting bracket 40, and a free end of the first elongated portion 61 of each clipping plate 60 is inserted in the corresponding slot 151 in the bent plate 15 of the chassis 10. The blocking tab 63 abuts against the sidewall 43 of the second mounting bracket 40. The connecting portions 71 of the PCI cards 70 are respectively coupled to the corresponding ports 21 on the transfer card 20. The latch member 50 is tightly inserted between the blocking wall 33 of the first mounting bracket 30 and the sidewall 43 of the second mounting bracket 40 in a direction perpendicular to the bottom wall 11 of the chassis 10. The cantilever 571 of the elastic securing member 57 abuts against the plate 35 of the first mounting bracket 30, and the protrusion 573 is engaged in the slot 351 in the plate 35 for limiting movement of the latch member 50 in a direction perpendicular to the bottom wall 11 of the chassis 10. An edge of the sidewall 53 of the latch member 50 is blocked by the blocking tabs 331 on the blocking wall 33 of the first mounting bracket, thereby limiting a movement of the latch member 50 in a direction perpendicular to the rear wall 13 of the chassis 10. The arcuate pressing portions 551 of the latch member 50 depress the blocking tabs 63 of the clipping plates 60 to abut the sidewall 43 of the second mounting bracket, thereby the blocking tabs 63 of the clipping plate 60 are tightly sandwiched between the latch member 50 and the second mounting bracket 40. Thus, the clipping plates 60 with the PCI cards 70 are mounted on the chassis 10.

In disassembly, the handle 575 of the elastic securing member 57 is pushed outward to force the protrusion 573 to disengage from the slot 351 in the plate 35 of the first mounting bracket 30. Then the latch member 50 is dragged out from the space between the blocking wall 33 of the first mounting bracket 30 and the sidewall 43 of the second mounting bracket 40. Thus, the blocking tabs 63 of the clipping plates 60 are released, and the clipping plates 60 with the PCI cards 70 can be disassembled from the chassis 10.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A retaining device for a PCI card, comprising:
  a chassis having a rear wall;
  a blocking wall perpendicular to the rear wall;
  a mounting bracket secured on the rear wall, the mounting bracket having a sidewall opposite to the blocking wall;
  a clipping plate configured for retaining the PCI card, the clipping plate comprising a first end engaged with the chassis and a second end abutting on the sidewall of the mounting bracket; and
  a latch member tightly sandwiched between the blocking wall and the sidewall of the mounting bracket; the latch member comprising a bottom wall, first and second sidewalls perpendicular to the bottom wall; the first sidewall pressing the second end of the clipping plate thereby forcing the second end of the clipping plate to abut against the sidewall of the mounting bracket; and the bottom wall is parallel to and engages the chassis rear wall to secure the latch member to the chassis.

2. The retaining device as described in claim 1, wherein an arcuate elastic positioning portion protrudes from the first sidewall proximate to the sidewall of the mounting bracket, the arcuate elastic positioning portion abuts against the second end of the clipping plate.

3. The retaining device as described in claim 2, wherein a width of the latch member between a peak of the arcuate elastic positioning portion and the other sidewall is greater than a distance between the blocking wall and the sidewall of the mounting bracket.

4. The retaining device as described in claim 2, wherein a plate parallel to the rear wall of the chassis perpendicularly extends from the blocking wall toward the sidewall of the mounting bracket, a slot is defined in the plate, and an elastic securing member is formed on the bottom wall of the latch member for engaging in the slot.

5. The retaining device as described in claim 4, wherein the securing member comprises an elastic arm formed on the bottom wall of the latch member and a pressing handle perpendicularly extends from an end of the elastic arm, and a protrusion engaging in the slot in the plate protrudes from the elastic arm in an opposite extending direction to the pressing handle.

6. The retaining device as described in claim 2, wherein a blocking tab perpendicularly protrudes from the blocking wall of the chassis for blocking an edge of the second sidewall of the latch member.

7. The retaining device as described in claim 1, wherein a side plate perpendicularly extends from the rear wall adjacent to the mounting bracket, and a receiving slot is defined in the side plate for the second end of the clipping plate inserting therein.

8. The retaining device as described in claim 2, wherein the mounting bracket has a panel parallel to the rear wall, a transversal slot is defined in the panel and extend to the sidewall of the mounting bracket, the first and second ends of the clipping plate abut on the mounting bracket and cover the slot.

9. A retaining device for a PCI card, comprising:
  a chassis having a rear wall,
  a blocking wall perpendicularly extending from the rear wall,
  a first mounting bracket and a second mounting bracket spacedly secured on the rear wall, a receiving space defined between the first mounting bracket and the second mounting bracket, the second mounting bracket having a sidewall;
  a clipping plate configured for retaining the PCI card, the clipping plate comprising a first end engaged with the chassis and a second end abutting on the second mounting bracket; and
  a latch member tightly received in the space between the blocking wall and the sidewall of the second mounting bracket, the latch member comprising a bottom wall, first and second sidewalls perpendicular to the bottom wall, and an arcuate elastic positioning portion that protrudes from the second sidewall proximate to the sidewall of the mounting bracket; the arcuate elastic positioning portion pressing the second end of the clipping plate thereby forcing the second end of the clipping plate to abut against the sidewall of the second mounting bracket.

10. The retaining device as described in claim 9, wherein a plate parallel to the rear wall of the chassis perpendicularly extends from the blocking wall toward the sidewall of the mounting bracket, a slot is defined in the plate, and an elastic securing member is formed on the bottom wall of the latch member for engaging in the slot.

11. The retaining device as described in claim 10, wherein the securing member comprises an elastic arm formed on the bottom wall of the latch member and a pressing handle perpendicularly extends from an end of the elastic arm, and a protrusion engaging in the slot in the plate protrudes from the elastic arm in an opposite extending direction to the pressing handle.

12. The retaining device as described in claim 10, wherein a blocking tab perpendicularly protrudes from the blocking wall of the chassis for blocking an edge of the second sidewall of the latch member.

13. The retaining device as described in claim 9, wherein a side plate perpendicularly extends from the rear wall adjacent to the mounting bracket, and a receiving slot is defined in the side plate for the second end of the clipping plate inserting therein.

14. The retaining device as described in claim 13, wherein the mounting bracket has a panel parallel to the rear wall, a transversal slot is defined in the panel and extend to the sidewall of the mounting bracket, the first end and second end of the clipping plate abut on the mounting bracket and cover the slot.

* * * * *